(12) United States Patent
McCue et al.

(10) Patent No.: US 11,187,005 B2
(45) Date of Patent: Nov. 30, 2021

(54) PROTECTIVE BARRIER

(71) Applicant: McCue Corporation, Peabody, MA (US)

(72) Inventors: David S. McCue, Manchester, MA (US); David DiAntonio, Andover, MA (US); Thomas Ustach, Revere, MA (US); Russell Harris, Leighton Buzzard (GB); Timothy David Stratford, Milton Keynes (GB); Fernando Fraga, Waltham, MA (US); Amanda Gene Meltzer, Boston, MA (US)

(73) Assignee: McCue Corporation, Danvers, MA (US)

( * ) Notice: Subject to any disclaimer, the term of this patent is extended or adjusted under 35 U.S.C. 154(b) by 836 days.

(21) Appl. No.: 15/940,281

(22) Filed: Mar. 29, 2018

(65) Prior Publication Data
US 2018/0283040 A1    Oct. 4, 2018

Related U.S. Application Data

(60) Provisional application No. 62/478,313, filed on Mar. 29, 2017.

(51) Int. Cl.
*E04H 17/14*    (2006.01)
*E04H 17/00*    (2006.01)

(52) U.S. Cl.
CPC ..... *E04H 17/1417* (2013.01); *E04H 17/1447* (2021.01); *E04H 17/006* (2021.01); *E04H 17/1465* (2021.01)

(58) Field of Classification Search
CPC . E01F 15/0453; E01F 15/0461; E01F 15/086; E01F 15/141; E01F 15/143;
(Continued)

(56) References Cited

U.S. PATENT DOCUMENTS

| 18,934 A | * | 12/1857 | Stanard | E04H 17/18 |
| | | | | 256/26 |
| 5,007,763 A | * | 4/1991 | Burgett | E01F 15/006 |
| | | | | 404/6 |

(Continued)

FOREIGN PATENT DOCUMENTS

EP    0297182 A1 *    1/1989    ........... E01F 15/141

*Primary Examiner* — Josh Skroupa
(74) *Attorney, Agent, or Firm* — Occhiuti & Rohlicek LLP

(57) ABSTRACT

A protective barrier includes a first end post including a first plastic outer cover, the first plastic outer cover including a first opening with a first pin-receiving socket formed therein, a second end post including a second plastic outer cover, the second plastic outer cover including a second opening with a second pin-receiving socket formed therein, a first hollow plastic rail including a first end disposed in the first opening of the first end post such that a first through hole in the first end is aligned with the first pin-receiving socket, and a second end disposed in the second opening of the second end post such that a second through hole in the second end is aligned with the second pin-receiving socket, a first pin extending through the first through hole in the first end of the hollow plastic rail, the first pin having a proximal end disposed in the first pin-receiving socket and a distal end disposed in a third pin-receiving socket, and a second pin extending through the second through hole in the second end of the hollow plastic rail, the second pin having a proximal end disposed in the second pin-receiving socket and a distal end disposed in a fourth pin-receiving socket.

20 Claims, 16 Drawing Sheets

(58) Field of Classification Search
CPC .............. E04H 17/006; E04H 17/1417; E04H 17/1421; E04H 17/1447; E04H 17/1465; E04H 17/18; E04H 17/20; E04H 17/21; E04H 17/23; E04H 2017/006; E04H 2017/1447; E04H 2017/1465
USPC .......................... 256/65.02, 65.11, 65.12, 66
See application file for complete search history.

(56) References Cited

U.S. PATENT DOCUMENTS

| | | | | |
|---|---|---|---|---|
| 5,609,327 | A * | 3/1997 | Amidon | E04H 17/18 256/19 |
| 5,891,534 | A * | 4/1999 | Sabin | A47B 96/02 428/11 |
| 7,393,154 | B1 * | 7/2008 | Dyke | E01F 15/085 256/13.1 |

* cited by examiner

PROTECTIVE BARRIER

CROSS-REFERENCE TO RELATED APPLICATIONS

This application claims the benefit of Provisional Application Ser. No. 62/478,313, filed Mar. 29, 2017, the contents of which are hereby entirely incorporated herein by reference.

BACKGROUND

This invention relates to a protective barrier for an industrial or retail facility.

Warehouses, distributions centers, factories, and similar facilities often have large stock handling equipment such as fork trucks which frequently move stock into, out of, and around the facility. In some examples, the stock is stored on shelving (e.g., pallet racks) and stock-handling equipment must navigate through the shelving to move stock to and from the shelving. Some facilities may have other obstacles (e.g., support columns or walls), which the stock handling equipment must navigate around as it travels through the facility.

As an operator navigates stock handling equipment through a facility, it is possible for the operator to inadvertently cause the stock handling equipment to collide with obstacles such as shelving, support columns, or walls. Such collisions are especially common as the stock handling equipment is navigated around corners (e.g., a corner of a pallet rack). When stock-handling equipment collides with an obstacle, both the obstacle and the stock handling equipment can become damaged. In the case of shelving, a strong enough collision can cause the shelving to collapse.

SUMMARY

In a general aspect, a protective barrier includes a first end post including a first plastic outer cover, the first plastic outer cover including a first opening with a first pin-receiving socket formed therein, a second end post including a second plastic outer cover, the second plastic outer cover including a second opening with a second pin-receiving socket formed therein, a first hollow plastic rail including a first end disposed in the first opening of the first end post such that a first through hole in the first end is aligned with the first pin-receiving socket, and a second end disposed in the second opening of the second end post such that a second through hole in the second end is aligned with the second pin-receiving socket, a first pin extending through the first through hole in the first end of the hollow plastic rail, the first pin having a proximal end disposed in the first pin-receiving socket and a distal end disposed in a third pin-receiving socket, and a second pin extending through the second through hole in the second end of the hollow plastic rail, the second pin having a proximal end disposed in the second pin-receiving socket and a distal end disposed in a fourth pin-receiving socket.

Aspects may include one or more of the following features.

Both the third pin-receiving socket and the fourth pin-receiving socket may be disposed in a mounting surface on which the protective barrier is mounted. The first end post may include a third opening with a fifth pin-receiving socket formed therein, the second end post may include a fourth opening with a sixth pin-receiving socket formed therein. The protective barrier may include a first cap disposed on the first end post, the first cap including a seventh pin-receiving socket, a second cap disposed on the second end post, the second cap including an eighth pin-receiving socket, a second hollow plastic rail including a third end disposed in the third opening of the first end post such that a third through hole in the third end is aligned with the fifth pin-receiving socket and the seventh pin-receiving socket, and a fourth end disposed in the fourth opening of the second end post such that a fourth through hole in the fourth end is aligned with the sixth pin-receiving socket and the eighth pin-receiving socket, a third pin extending through the third through hole in the third end of the second hollow plastic rail, the third pin having a proximal end disposed in the seventh pin-receiving socket and a distal end disposed in a fifth pin-receiving socket, a fourth pin extending through the fourth through hole in the fourth end of the second hollow plastic rail, the fourth pin having a proximal end disposed in the eighth pin-receiving socket and a distal end disposed in a sixth pin-receiving socket.

The first hollow plastic rail may have a first degree of rigidity and the second hollow plastic rail may have a second degree of rigidity, the first degree of rigidity being greater than the second degree rigidity. The protective barrier may include a first cap disposed on the first end post, the first cap including the third pin-receiving socket and a second cap disposed on the second end post, the second cap including the fourth pin-receiving socket. A portion of the first opening may be formed by a portion of the first cap and a portion of the second opening is formed by a portion of the second cap.

The third pin-receiving portion may be disposed in the first opening of the first end post and the fourth pin-receiving portion is disposed in the second opening in the second end post. The first end post may include a first anchoring mechanism disposed in the first outer cover, the first anchoring mechanism configured to anchor the first end post to a surface, and the second end post may include a second anchoring mechanism disposed in the second outer cover, the second anchoring mechanism configured to anchor the second end post to the surface.

The first anchoring mechanism may include a first shock absorption mechanism and the second anchoring mechanism may include a second shock absorption mechanism. The first anchoring mechanism may include a first metallic core and the second anchoring mechanism may include a second metallic core.

In another general aspect, a method for assembling a protective barrier includes affixing an anchoring mechanism to a surface. A plastic outer cover is affixed to the anchoring mechanism. A first end of a first plastic rail is installed in a first opening in the plastic outer cover. A first pin is placed through a through hole in the first end of the first plastic rail such that a proximal end of the first pin is disposed in a first pin-receiving socket in the first opening and a proximal end of the first pin is disposed in a second pin-receiving socket.

The second pin receiving socket may be disposed in the surface. A first end of a second plastic rail may be installed in a second opening in the plastic outer cover. A second pin is placed through a through hole in first end of the second plastic rail such that a distal end of the second pin is disposed in a third pin-receiving socket in the second opening. A cap with a fourth pin-receiving socket is placed on the plastic outer cover such that a proximal end of the second pin is disposed in the fourth pin-receiving socket.

The first assembly may include a first top opening on a top surface of the first plastic outer cover and the second assembly may include a second top opening on a top surface of the second plastic outer cover. A first cap may be disposed in the first top opening and a second cap may be disposed in the second top opening. A first post may be disposed in the first top opening and a second post may be disposed in the second top opening. One or more rails may be coupled to and extend between the first post and the second post. The first post may be coupled to a first anchoring mechanism disposed in the first assembly and the second post may be coupled to a second anchoring mechanism disposed in the second assembly.

The protective barrier may include a first strike plate attached to the first assembly and a second strike plate attached to the second assembly. The first assembly may include a third opening with a fifth pin-receiving socket formed therein.

The protective barrier may include a second hollow plastic rail including a third end disposed in the third opening of the first assembly such that a third through hole in the third end is aligned with the fifth pin-receiving socket, and a third pin extending through the third through hole in the third end of the second hollow plastic rail, the third pin having a proximal end disposed in the fifth pin-receiving socket and a distal end disposed in a sixth pin-receiving socket. The first opening and the third opening may be disposed on opposite sides of the first assembly. The first opening may face in a first direction, the second opening may face in a second direction, and the first direction may be perpendicular to the second direction.

Aspects may have one or more of the following advantages.

Among other advantages, aspects provide a protective barrier that is easier to assemble than conventional protective barriers. Aspects provide a protective barrier with increased height, offering greater protection for warehouse assets and greater visibility. Aspects are assembled using a vertical pinning strategy, providing greater strength than conventional assembly strategies. Aspects use two types of rails, with a lower rail type being more rigid than an upper rail type. The greater flexibility of the upper rail type reduces a torque applied to the anchoring mechanisms when the upper rail is struck by warehouse equipment.

Other features and advantages of the invention are apparent from the following description, and from the claims.

DESCRIPTION

1 First Protective Collision Barrier

Figure 1:
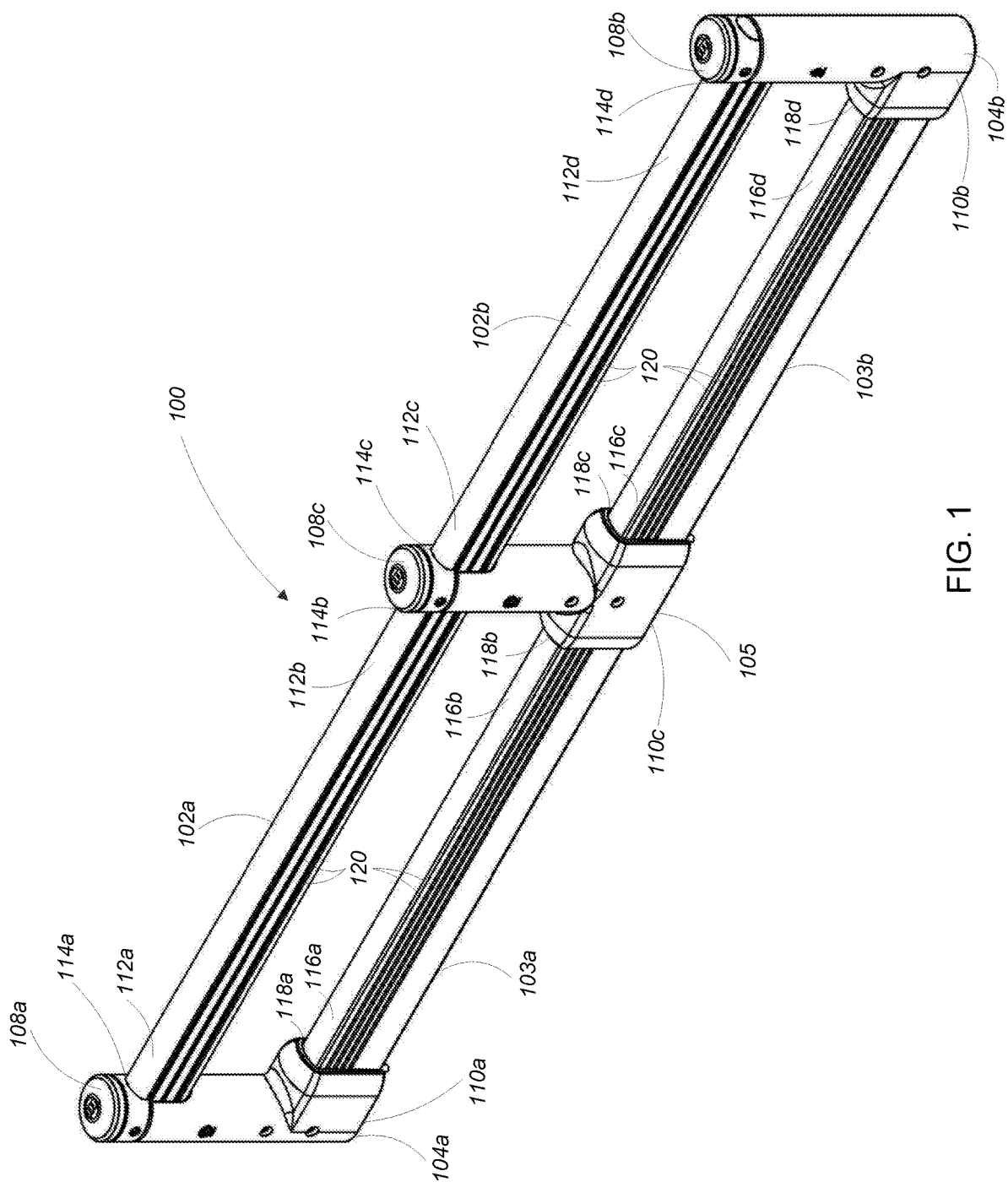
FIG. 1 is a protective barrier.

Referring to FIG. 1, a protective barrier 100 is configured to protect a warehouse asset (e.g., a pallet rack, a pedestrian walkway, or a support column) from unintended collisions. The protective barrier 100 includes a number of posts 104a-b, 105 interconnected by plastic bumper rails 102a-b, 103a-b.

The protective barrier 100 includes a first rounded end post 104a, a second rounded end post 104b and a center post 105, each of which is anchored into the ground using an anchoring mechanism (as is described in greater detail below). It is noted that, in some examples, the terms assembly and post are used interchangeably herein.

An upper portion 108a of the first rounded end post 104a is connected to an upper portion 108c of the center post 105 by a first upper plastic bumper rail 102a. The first upper plastic bumper rail 102a has a first end 112a inserted into an upper opening 114a of the first rounded end post 104a and a second end 112b inserted into an upper opening 114b of the center post 105.

A lower portion 110a of the first rounded end post 104a is connected to a lower portion 110c of the center post 105 by a first lower plastic bumper rail 103a. The first lower plastic bumper rail 103a has a first end 116a inserted into a lower opening 118a of the first rounded end post 104a and a second end 116b inserted into a first lower opening 118b of the center post 105.

An upper portion 108b of the second rounded end post 104b is connected to the upper portion 108c of the center post 105 by a second upper plastic bumper rail 102b. The second upper plastic bumper rail 102b has a first end 112c inserted into an upper opening 114c of the center post 105 and a second end 112d inserted into an upper opening 114d of the second rounded end post 104b.

A lower portion 110b of the second rounded end post 104b is connected to the lower portion 110c of the center post 105 by a second lower plastic bumper rail 103b. The second lower plastic bumper rail 103b has a first end 116c inserted into a second lower opening 118c of the center post 105 and a second end 116d inserted into a lower opening 118d of the second rounded end post 104b.

1.1 Plastic Bumper Rails

As is noted above, in some examples, the protective barrier 100 includes two types of plastic bumper rails: upper plastic bumper rails and lower plastic bumper rails. In general, both types of plastic bumper rails are hollow parts formed by extruding a plastic material such as high-density polyethylene (HDPE). In some examples, both types of plastic bumper rails include ribs 120 which increase the amount of plastic material present in the walls of the plastic bumper rails, thereby increasing the rigidity and collision absorption capability of the plastic bumper rails.

Figure 2:
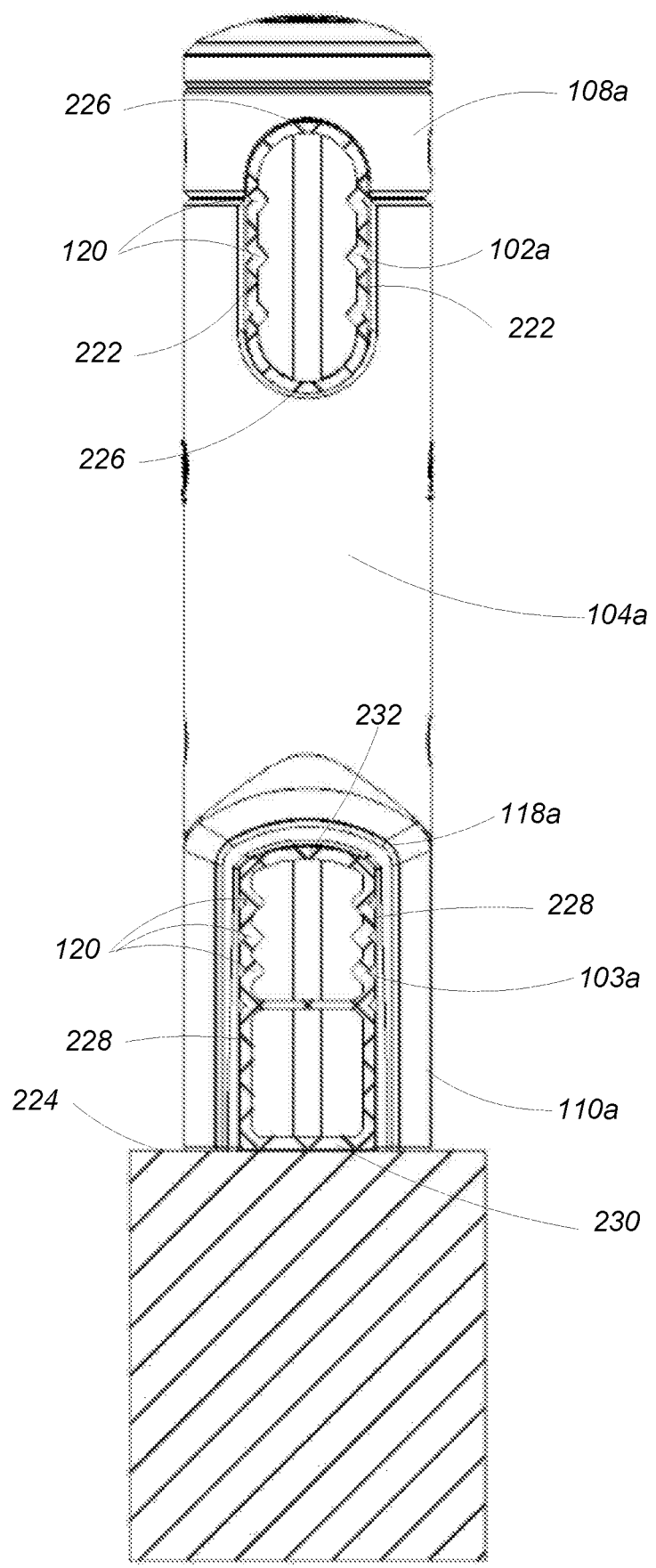
FIG. 2 is cross-sectional view of plastic bumper rails of the protective barrier.

Referring to FIG. 2, in some examples, the upper plastic bumper rails 102a-b have a substantially oblong cross-sectional shape with substantially flat sidewalls 222 facing in a direction substantially perpendicular to a surface 224 on which the protective barrier 100 is mounted and rounded top and bottom walls 226.

In some examples, the lower plastic bumper rails 103a-b have a substantially rectangular shape with substantially flat sidewalls 228 facing in a direction substantially perpendicular to the surface 424, a rounded top wall 232, and a substantially flat bottom wall 230 facing in a direction substantially parallel to and configured to rest near or on the surface 224 on which the protective barrier 100 is mounted. In some examples, the lower plastic bumper rails 103a-b have a reinforcing rib 234 extending along a length of the rail, facing a direction substantially parallel to the surface 224, and connecting the sidewalls 228

In some examples, the upper plastic bumper rails are configured to be more flexible than the lower plastic bumper rails.

1.2 Rounded End Posts

Figure 3:
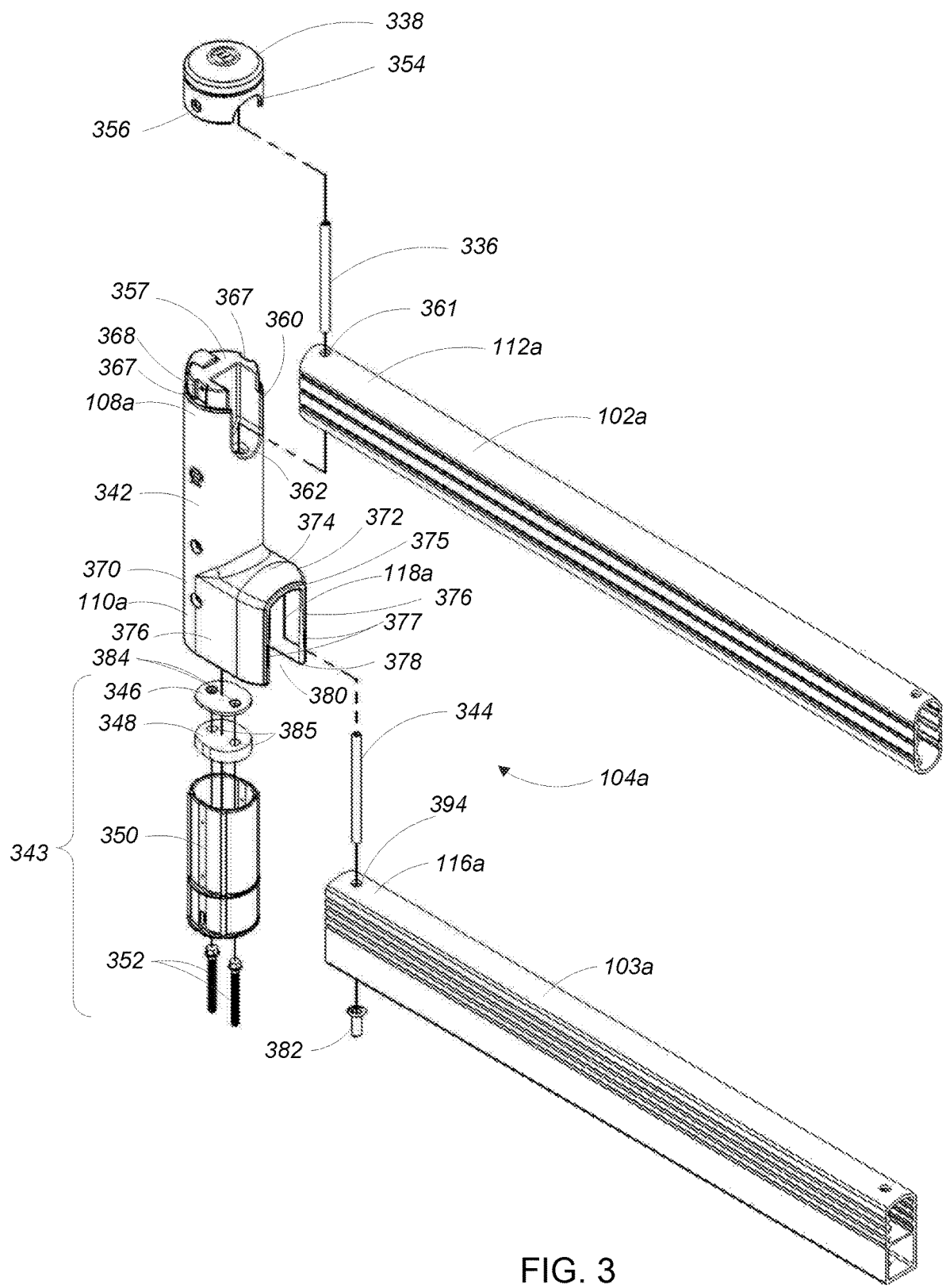
FIG. 3 is an exploded view of a rounded end post.
Figure 4:
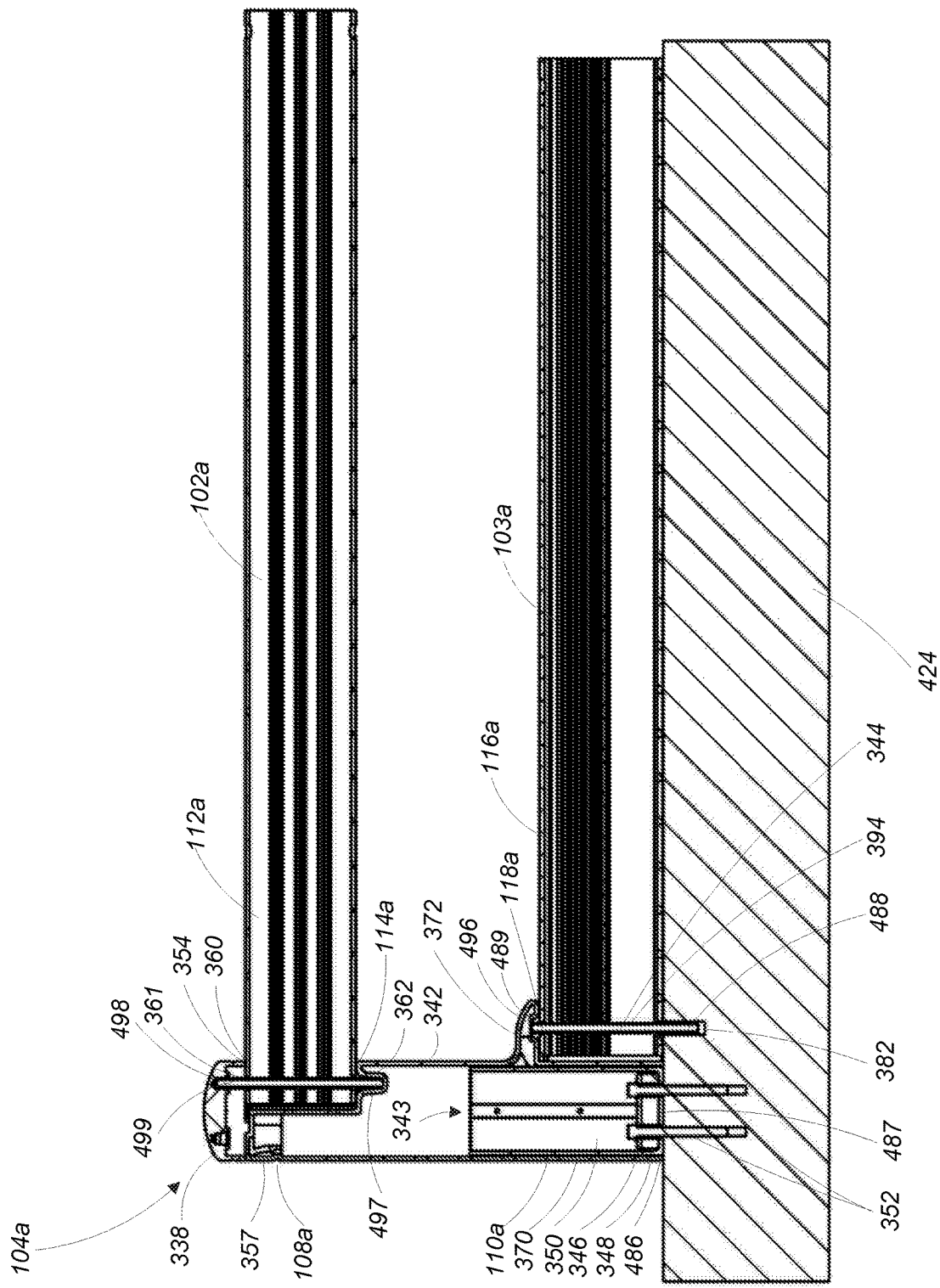
FIG. 4 is a cross-sectional view of the rounded end post of FIG. 3.

Referring to FIGS. 3 and 4, the first rounded end post 104a is an assembly including a cap 338, a first plastic pin 336, an outer shell 342, a second plastic pin 344, and an anchoring assembly 343 including a washer 346 with through holes 384, an impact absorption member 348 with through holes 385, an inner core 350, a number of fasteners 352, and a first pin-receiving socket 382.

The anchoring assembly 343 securely attaches the first rounded end post 104a and the first end 116a of the first lower plastic bumper rail 103a to a mounting surface 424.

When the anchoring assembly is assembled, the impact absorption member 348 is disposed in the inner core 350 and the washer 346 is disposed on top of the impact absorption member 348. The fasteners 352 extend through the holes 384 in the washer 346, the holes 385 in the impact absorption member 348, holes 486 in a bottom wall 487 of the inner core 350, and are secured into the mounting surface 424. The first pin-receiving socket 382 is secured into the mounting surface 424 at a predefined distance from the inner core 350.

The first end 116a of the first lower plastic bumper rail 103a includes a through hole 394. When the protective barrier 100 is assembled, the through hole 394 of the first end 116a of the first lower plastic bumper rail 103a is aligned with the first pin-receiving socket and the second plastic pin 344 is positioned through the through hole 394 with a distal end 488 of the second plastic pin 344 received in the first pin-receiving socket 382.

The outer shell 342 is a substantially cylindrical member including an upper portion corresponding to the upper portion 108a of the first rounded end post 104a, a lower portion corresponding to the lower portion 110a of the first rounded end post 104a.

The lower portion 110a of the outer shell 342 includes a substantially cylindrical portion 370 with a boot 372 extending therefrom. A distal end 378 of the lower portion 110a includes an opening 380.

The boot 372 has a rounded top wall 374 attached to the substantially cylindrical portion 370 and extending away from the substantially cylindrical portion 370 in a direction parallel to the mounting surface on which the protective barrier 100 is mounted. Two sidewalls 376 are attached to the substantially cylindrical portion 370 and the rounded top wall 372 and extend away from the substantially cylindrical portion 370 with an orientation substantially perpendicular to the mounting surface 424. A distal end 375 of the rounded top wall 374 and distal ends 377 of the two sidewalls 376 form the lower opening 118a of the first rounded end post 104a. An underside of the rounded top wall 374, on the interior of the boot 372, includes a second pin-receiving socket 496.

When the protective barrier 100 is assembled, the substantially cylindrical portion 370 of the lower portion 110a of the outer shell 342 is secured on the anchoring assembly 343 (e.g., using fasteners, not shown). The boot 372 receives the first end 116a of the first lower plastic bumper rail 103a and a proximal end 489 of the second plastic pin 344 is received in the second pin-receiving socket 496. With the second plastic pin 344 is positioned through the first end 116a of the first lower plastic bumper rail 103a via the through hole 394 with the proximal end 489 of the second plastic pin 344 received in the second pin-receiving socket 496 and the distal end 488 of the second plastic pin 344 received in the first pin-receiving socket 382, the first end 116a of the first lower plastic bumper rail 103a is held captive in the lower opening 118a of the first rounded end post 104a.

The upper portion 108a of the outer shell 342 is substantially cylindrical and includes a cap-receiving portion 357 and a first rail-receiving portion 360. The first rail-receiving portion 360 is sized and shaped to receive a portion of the first end 112a of the first upper plastic bumper rail 102a. The first end 112a of the first upper plastic bumper rail 102a includes a through hole 361. A third pin-receiving socket 362 is disposed in the first rail-receiving portion 360.

The cap receiving portion 357 has an outer diameter less than or equal to an inner diameter of the cap 338 such that the cap 338 can receive the cap receiving portion 357. In some examples, the cap-receiving portion 357 includes alignment grooves 367 that correspond to alignment protrusions (not shown) on an inside of the cap 338.

The cap 338 is a substantially cylindrical member with a rounded top surface. A sidewall of the cap includes a cut-out portion 354. An inner surface of the cap 338 includes a fourth pin-receiving socket 498.

When the protective barrier 100 is assembled, the first end 112a of the first upper plastic bumper rail 102a is positioned in the first rail receiving portion 360 with its through hole 361 aligned with the third pin-receiving socket 362. The first plastic pin 336 is positioned through the through hole 361 with its distal end 497 received in the third pin-receiving socket 362.

The cap 338 is positioned on the cap-receiving portion 357 with its alignment protrusions (not shown) inserted into the alignment grooves 367 of the cap-receiving portion 357. The cutout portion 354 of the cap 338 is aligned with the rail-receiving portion 360 of the upper portion 108a of the outer shell 342, forming the upper opening 114a. A proximal end 499 of the first plastic pin 336 is received in the fourth pin-receiving socket 498.

With the first plastic pin 336 is positioned through the first end 112a of the first upper plastic bumper rail 102a via the through hole 361 with ends of the first plastic pin 336 received in the third pin-receiving socket 362 and the fourth pin-receiving socket 498, the first end 112a of the first upper plastic bumper rail 102a is held captive in the upper opening 114a in the upper portion 108a of the first rounded end post 104a.

The second rounded end post 104b has substantially the same structure as the first rounded end post 104b and, for the sake of brevity, will not be described further.

1.3 Center Post

Figure 5:
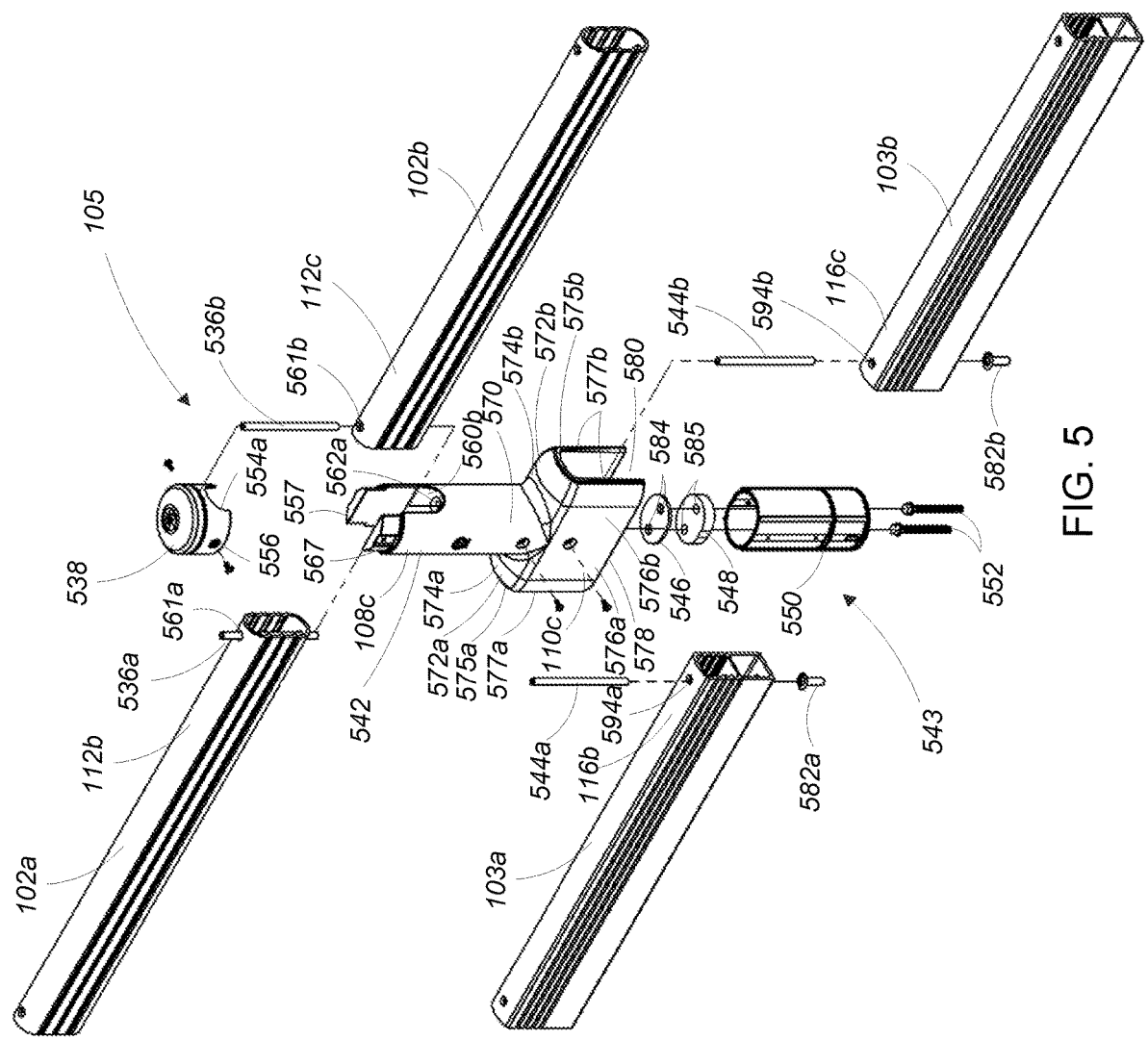
FIG. 5 is an exploded view of a center post.
Figure 6:
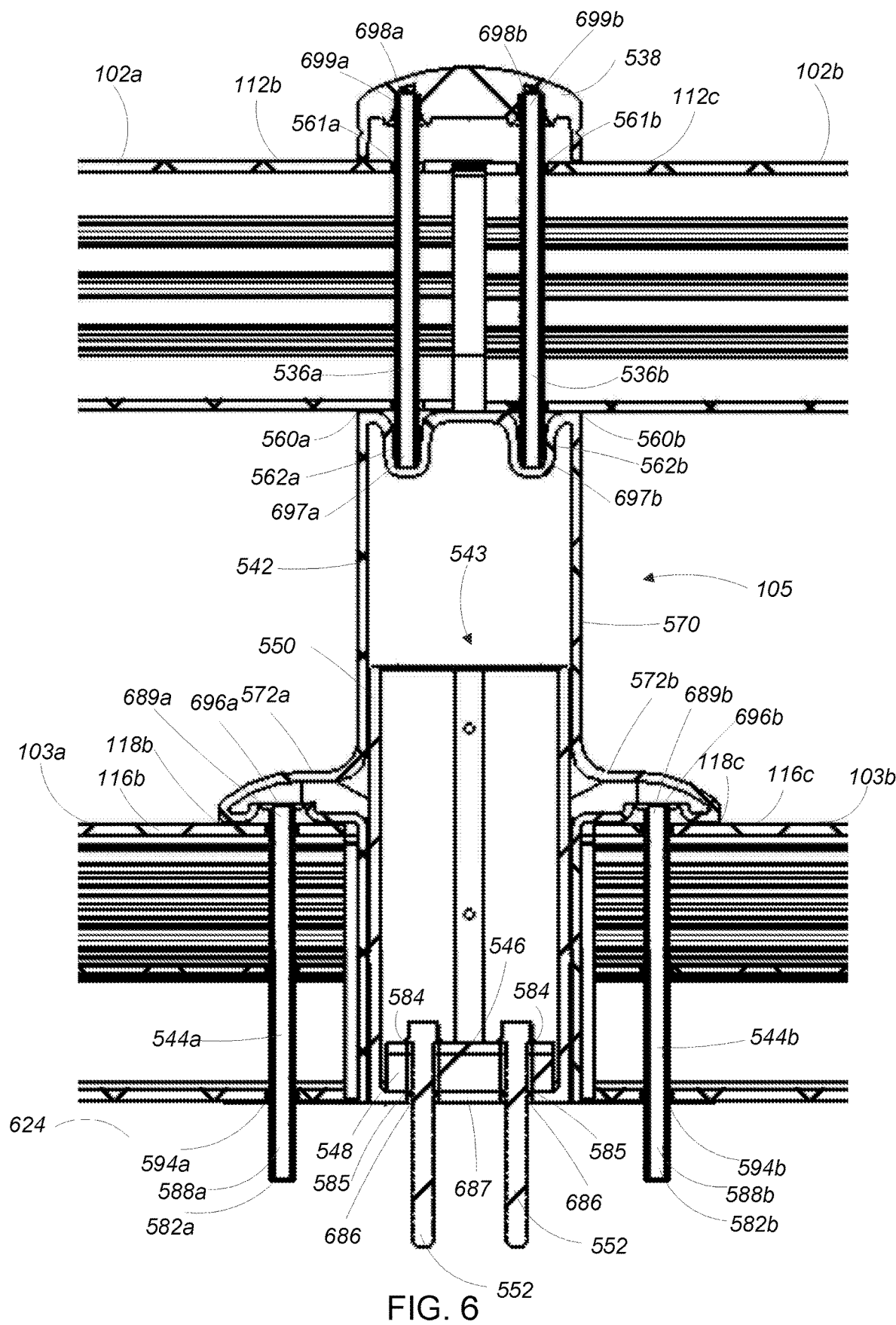
FIG. 6 is a cross-sectional view of the center post of FIG. 5.

Referring to FIGS. 5 and 6, the center post 105 is an assembly including a cap 538, a first plastic pin 536a, a second plastic pin 536b, an outer shell 542, a third plastic pin 544a, a fourth plastic pin 544b, and an anchoring assembly 543 including a washer 546, an impact absorption member 548, an inner core 550, a number of fasteners 552, a first pin-receiving socket 582a, and a second pin-receiving socket 582b.

The anchoring assembly 543 securely attaches the center post 105, the second end 116b of the first lower plastic bumper rail 103a, and the first end 116c of the second lower plastic bumper rail 103b to a mounting surface 624.

When the anchoring assembly 543 is assembled, the impact absorption member 548 is disposed in the inner core 550 with the washer 546 disposed on top of the impact absorption member 548. The fasteners 552 extend through holes 584 in the washer 546, holes 585 in the impact absorption member 548, holes 686 in a bottom wall 687 of the inner core 550, and are secured into the mounting surface 624.

The first pin-receiving socket 582a is secured into the mounting surface 624 on a first side of the inner core 550 and at a predefined distance from the inner core 550. The second pin-receiving socket 582b is secured into the mounting surface 624 on a second side, opposite the first side, of the inner core 550 and at a predefined distance from the inner core 550.

The second end 116b of the first lower plastic bumper rail 103a includes a first through hole 594a. The first end 116c of the second lower plastic bumper rail 103b includes a second through hole 594b. When the protective barrier 100 is assembled, the first through hole 594a of the second end 116b of the first lower plastic bumper rail 103a is aligned with the first pin-receiving socket 582a and the third plastic pin 544a is positioned through the first through hole 594a with a distal end 588a of the third plastic pin 544a received in the first pin-receiving socket 582a.

Similarly, the second through hole 594b of the first end 116c of the second lower plastic bumper rail 103b is aligned with the second pin-receiving socket 582b and the fourth plastic pin 544b is positioned through the second through hole 594b with a distal end 588b of the fourth plastic pin 544b received in the second pin-receiving socket 582b.

The outer shell 542 is a substantially cylindrical member including a top portion corresponding to the upper portion 108c of the center post 105, a bottom portion corresponding to the lower portion 110c of the center post 105.

The lower portion 110c of the outer shell 542 includes a substantially cylindrical portion 570 with a first boot 572a extending from a first side and a second boot 572b extending from a second side, opposite from the first side (i.e., at a 180° angle from the first boot 572a). A distal end 578 of the lower portion 110c includes an opening 580.

The first boot 572a has a first rounded top wall 574a attached to the substantially cylindrical portion 570 and extending away from the substantially cylindrical portion 570 with an orientation parallel to the mounting surface 624 on which the protective barrier 100 is mounted. Two first sidewalls 576a are attached to the substantially cylindrical portion 570 and the first rounded top wall 572a, and extend away from the substantially cylindrical portion 570 with an orientation substantially perpendicular to the mounting surface 624. A distal end 575a of the first rounded top wall 574a and distal ends 577a of the two sidewalls 576a form the first lower opening 118b of the center post 105. An underside of the first rounded top wall 574a, on the interior of the first boot 572a, includes a third pin-receiving socket 696a.

Similarly, the second boot 572b has a second rounded top wall 574b attached to the substantially cylindrical portion 570 and extending away from the substantially cylindrical portion 570 with an orientation parallel to the mounting surface 624 on which the protective barrier 100 is mounted. Two second sidewalls 576b are attached to the substantially cylindrical portion 570 and the second rounded top wall 572b, and extend away from the substantially cylindrical portion 570 with an orientation substantially perpendicular to the mounting surface 624. A distal end 575b of the second rounded top wall 574b and distal ends 577b of the two second sidewalls 576b form the second lower opening 118c of the center post 105. An underside of the second rounded top wall 574b, on the interior of the second boot 572b, includes a fourth pin-receiving socket 696b.

When the protective barrier 100 is assembled, the substantially cylindrical portion 570 of the lower portion 110c of the outer shell 542 is secured on the anchoring assembly 543 (e.g., using fasteners 552). The first boot 572a receives the second end 116b of the first lower plastic bumper rail 103a and the proximal end 689a of the third plastic pin 544a is received in the third pin-receiving socket 696a. With the third plastic pin 544a positioned through the second end 116b of the first lower plastic bumper rail 103a via the through hole 594a with the proximal end 689a of the third plastic pin 544a received in the third pin-receiving socket 696a and the distal end 588a of the third plastic pin 544a received in the first pin-receiving socket 582a, the second end 116b of the first lower plastic bumper rail 103a is held captive in the first lower opening 118b of the center post 105.

Similarly, the second boot 572b receives the first end 116c of the second lower plastic bumper rail 103b and the proximal end 689b of the fourth plastic pin 544b is received in the fourth pin-receiving socket 696b. With the fourth plastic pin 544b positioned through the first end 116c of the second lower plastic bumper rail 103b via the through hole 594b with the proximal end 689b of the fourth plastic pin 544b received in the fourth pin-receiving socket 696b and the distal end 588b of the fourth plastic pin 544b received in the second pin-receiving socket 582b, the first end 116c of the second lower plastic bumper rail 103b is held captive in the second lower opening 118c of the center post 105.

The upper portion 108c of the outer shell 542 is substantially cylindrical and includes a cap-receiving portion 557, a first rail-receiving portion 560a, and a second rail receiving portion 560b opposite the first rail-receiving portion 560a. The first rail-receiving portion 560a is sized and shaped to receive a portion of the second end 112b of the first upper plastic bumper rail 102a. The portion of the second end 112b of the first upper plastic bumper rail 102a includes a through hole 561a. The second rail-receiving portion 560b is sized and shaped to receive a portion of the first end 112c of the second upper plastic bumper rail 102b. The portion of the first end 112c of the second upper plastic bumper rail 102b includes a through hole 561b. A fifth pin-receiving socket 562a is disposed in the first rail-receiving portion 560a. A sixth pin-receiving socket 562b is disposed in the second rail receiving portion 560b.

The cap receiving portion 557 has an outer diameter less than or equal to an inner diameter of the cap 538 such that the cap 538 can receive the cap receiving portion 557. In some examples, the cap-receiving portion 557 includes alignment grooves 567 that correspond to alignment protrusions (not shown) on an inside of the cap 538.

The cap 538 is a substantially cylindrical member with a rounded top surface. A sidewall of the cap includes a first cut-out portion (not shown), a second cut-out portion 554b. An inner surface of the cap 538 includes a seventh pin-receiving socket 698a and an eighth pin-receiving socket 698b.

When the protective barrier 100 is assembled, the second end 112b of the first upper plastic bumper rail 102a is positioned in the first rail receiving portion 560a with its through hole 561a aligned with the fifth pin-receiving socket 562a. Similarly, the first end 112c of the second upper plastic bumper rail 102b is positioned in the second rail receiving portion 560b with its through hole 561b aligned with the sixth pin-receiving socket 562b. The first plastic pin 536a is positioned through the through hole 561a with its distal end 697a received in the fifth pin-receiving socket 562a. The second plastic pin 536b is positioned through the through hole 561b with its distal end 697b received in the sixth pin-receiving socket 562b The cap 538 is positioned on the cap-receiving portion 557 with its alignment protrusions (not shown) inserted into the alignment grooves 567 of the cap receiving portion 557. The cutout portion 554 of the cap 538 is aligned with the rail receiving portion 560 of the upper portion 108a of the outer shell 542, forming the upper opening 114a. A proximal end 699a of the first plastic pin 536a is received in the seventh pin-receiving socket 698a. A proximal end 699b of the second plastic pin 536b is received in the eighth pin-receiving socket 698b With the first plastic pin 536a positioned through the second end 112b of the first upper plastic bumper rail 102a via the through hole 561a with its distal end 697a received in the fifth pin-receiving socket 562a and its proximal end 699a received in the seventh pin-receiving socket 698a, the second end 112b of the first upper plastic bumper rail 102a is held captive in the upper opening 114b in the upper portion 108c of the center post 105. Similarly, with the second plastic pin 536b positioned through the first end 112c of the second upper plastic bumper rail 102b via the through hole 561b with its distal end 697b received in the sixth pin-receiving socket 562b and its proximal end 699b received in the eighth pin-receiving socket 698b, the first end 112c of the second upper plastic bumper rail 102b is held captive in the upper opening 114c in the upper portion 108c of the center post 105.

1.4 Corner Post

Figure 7:
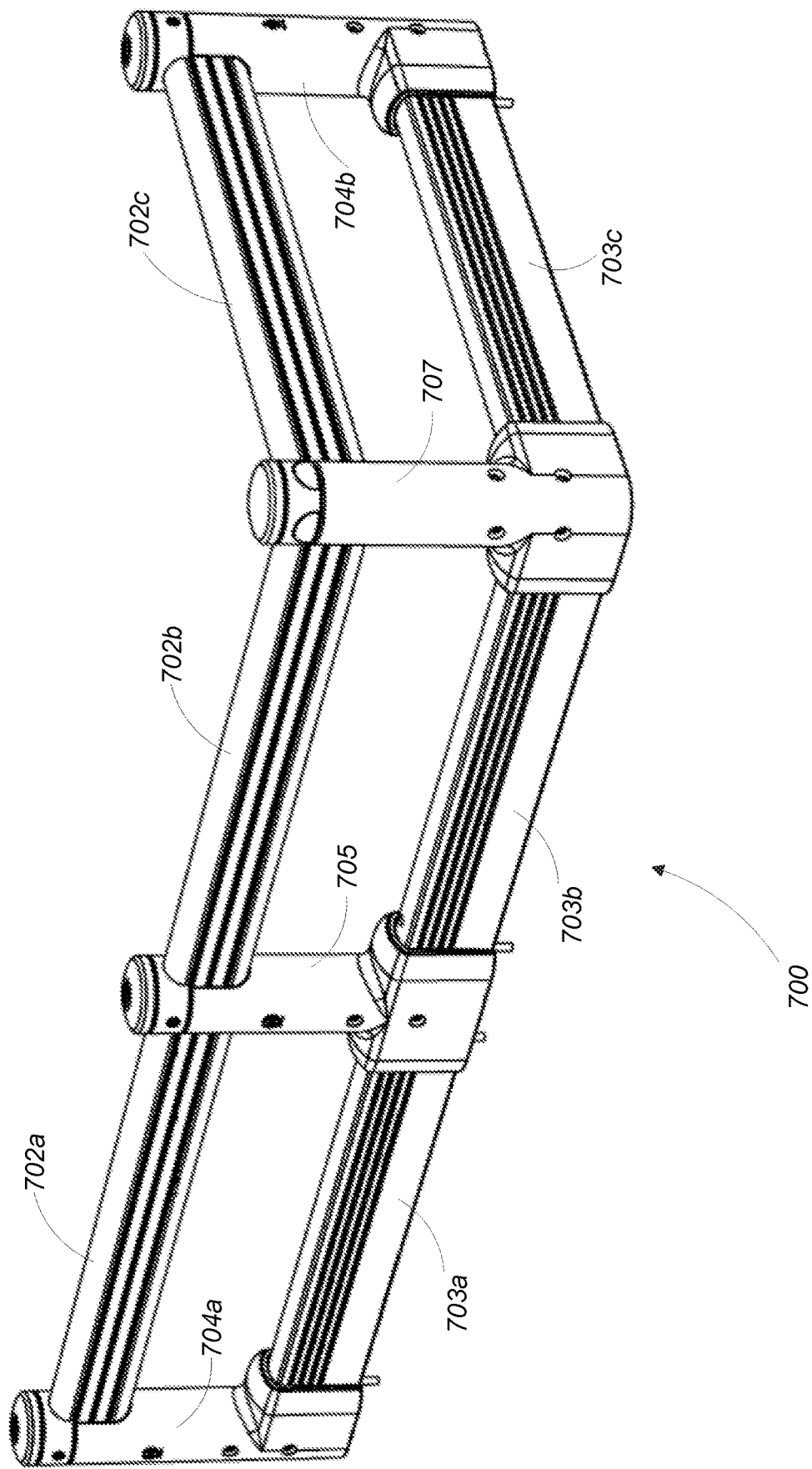
FIG. 7 is a protective barrier including a corner post.
Figure 8:
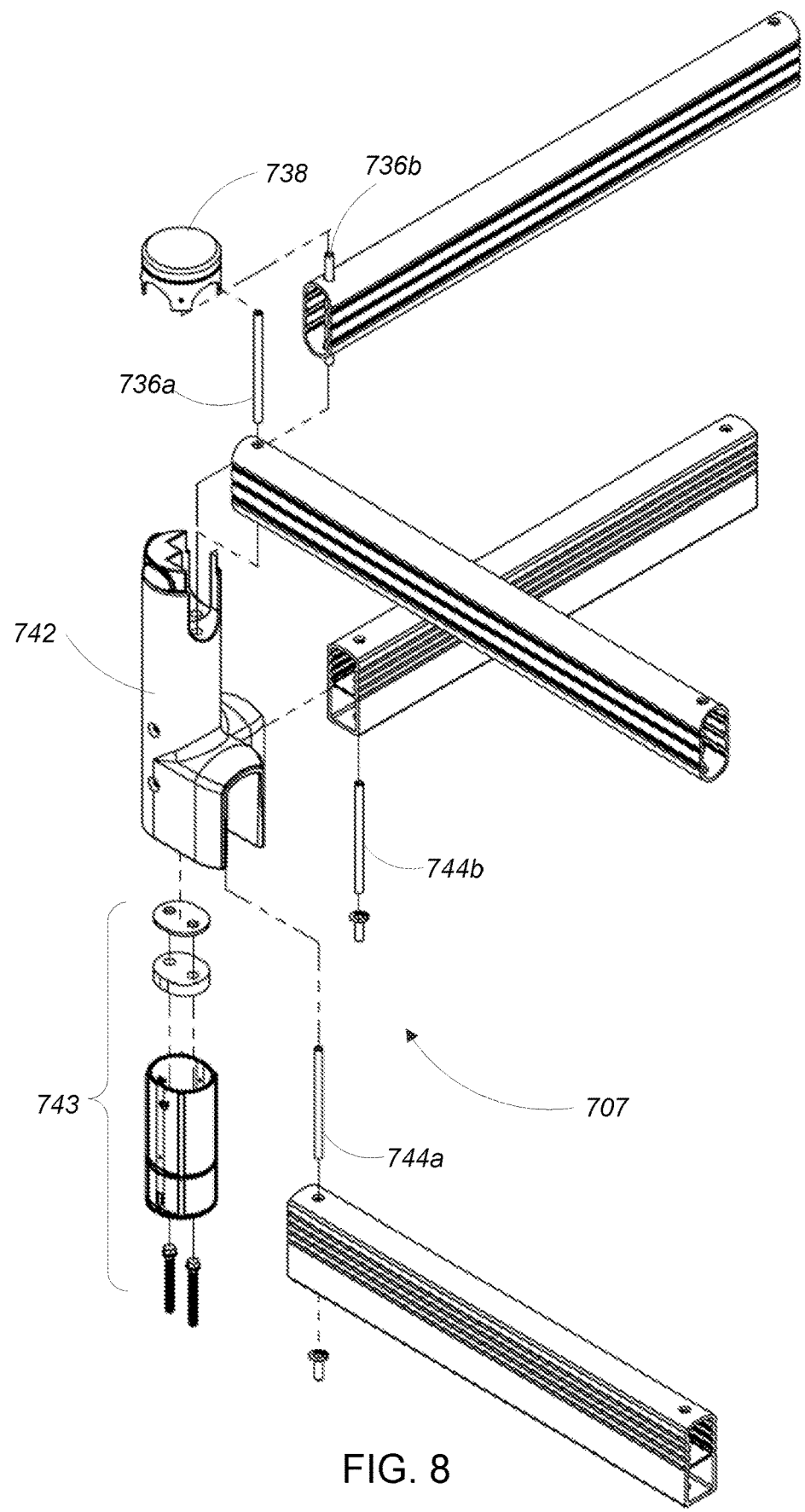
FIG. 8 is an exploded view of the corner post of FIG. 7.

Referring to FIGS. 7 and 8, another embodiment of the protective barrier 700 includes a number of rounded end posts 704a, 704b, a center post 705, and an angled corner post 707. The posts 704a, 704b, 705, 707 are interconnected by upper plastic bumper rails 702a-c and lower plastic bumper rails 703a-c in much the same way as the posts of the protective barrier 100 of FIG. 1 are interconnected by plastic bumper rails.

The inclusion of the angled corner post 707 in the protective barrier 700 allows configuration of the protective barrier 700 into a substantially 'L' for protecting an asset such as a corner of a wall or warehouse shelf. More generally, the inclusion of one or more angled corner posts 707 in the protective barrier allows configuration of the barrier into any number of complex shapes such as squares or rectangles, triangles, obtuse angles, and acute angles.

The angled corner post includes a cap 738, a outer shell 742, an anchoring mechanism 743, a first pin 736a, a second pin, 736b, a third pin 744a, and a fourth pin 744b. In general, the angled corner post 707 substantially structurally similar to the center post 105 (as is described in relation to FIG. 5 and FIG. 6) with the exception that the openings for receiving the plastic bumper rails are not disposed on opposite sides (i.e., separated by 180°) of the angled corner post 707 (as is the case with the center post 105) but are instead separated by angles other than 180° (e.g., 90° or 45°). Due to the structural similarities between the angled corner post 707 of FIG. 7 and the center post 105 of FIG. 1, the assembly of the angled corner post 707 is substantially the same as the assembly of the center post 105 (described in relation to FIG. 5 and FIG. 6) and will not be described further herein.

2 Second Protective Collision Barrier

Figure 9:
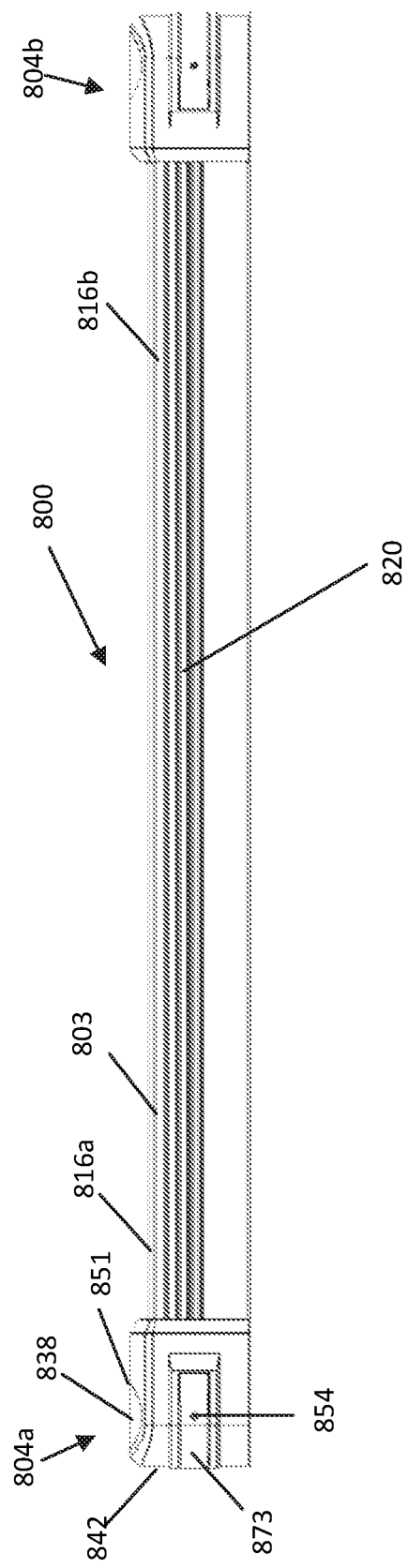
FIG. 9 is another example of a protective barrier.
Figure 10:
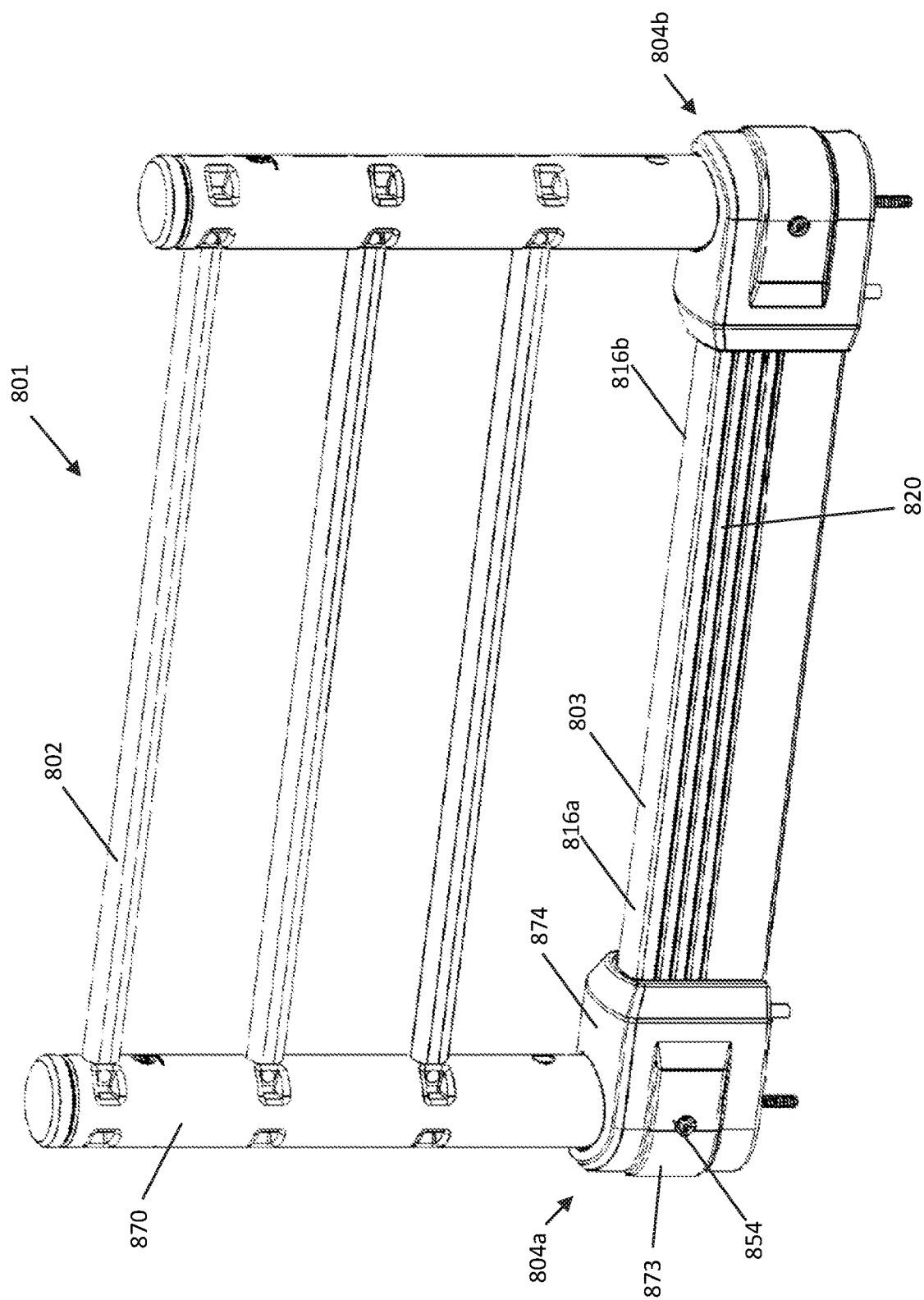
FIG. 10 is the protective barrier of FIG. 9 configured with plastic bumper rails.
Figure 11:
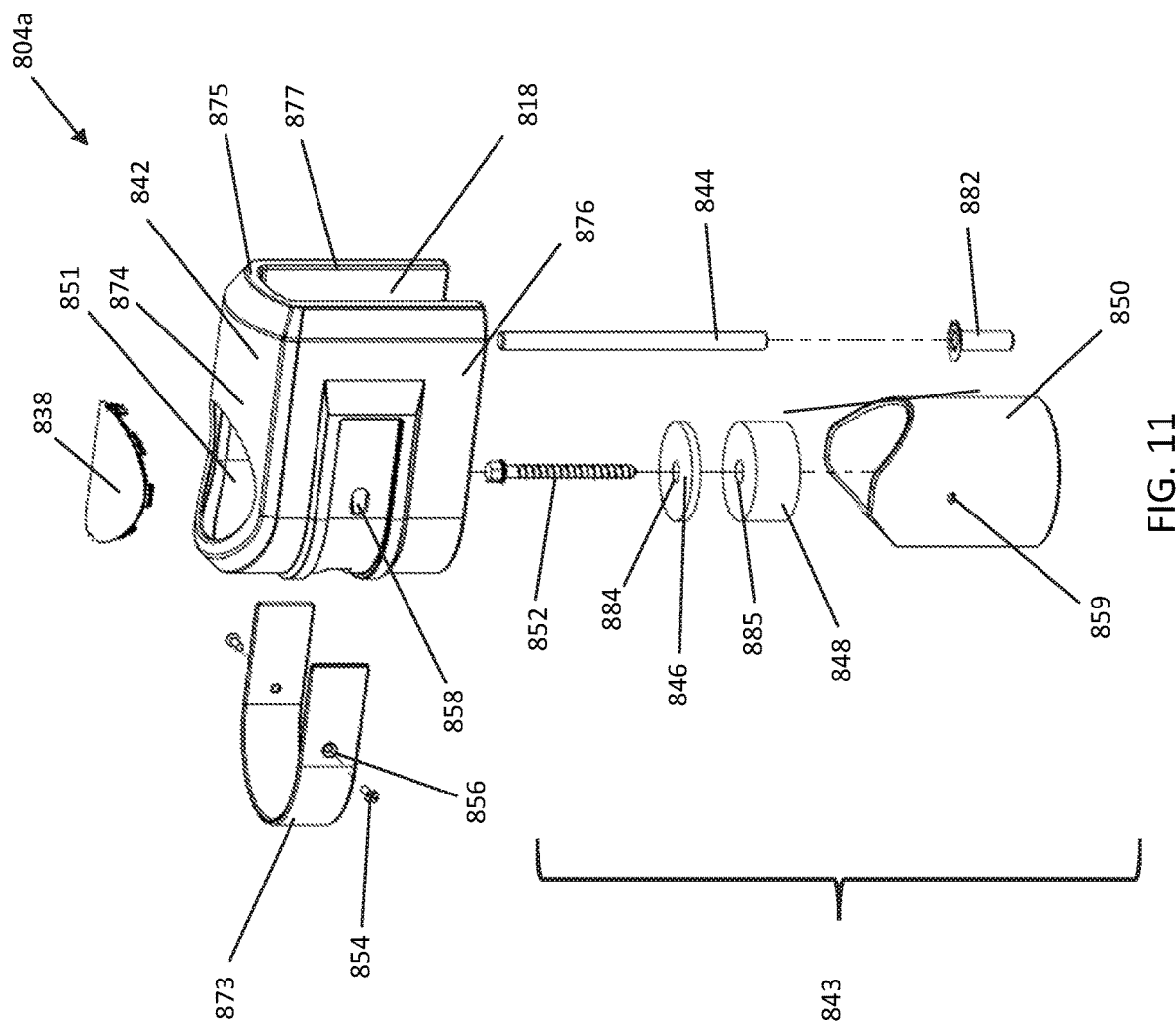
FIG. 11 is an exploded view of a rounded end assembly.
Figure 12:
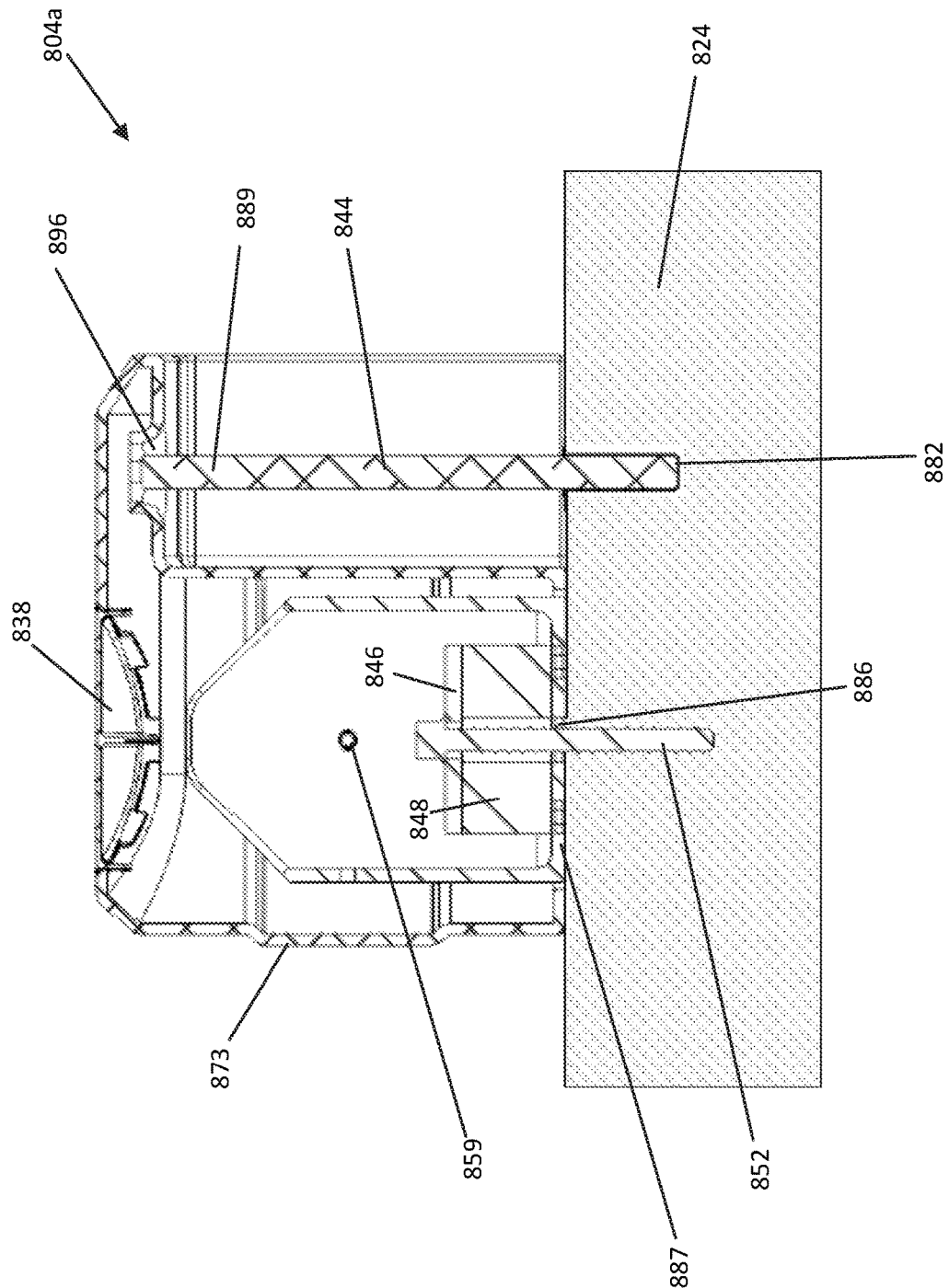
FIG. 12 is a cross-sectional view of the rounded end assembly of FIG. 11.

Referring to FIGS. 9 and 10, another example of a protective collision barrier can be configured both as a low-profile barrier 800 and as a pedestrian barrier 801. In some examples the protective collision barrier includes a first rounded end assembly 804a and a second rounded end assembly 804b. A plastic bumper rail 803 (e.g., one of the plastic bumper rails described above) has a first end 816a secured in a rail opening 818 in the first rounded end assembly 804a and a second end 816b secured in a rail opening 818 in the second rounded end assembly 804b such that the plastic bumper rail 803 connects the first rounded end assembly 804a to the second rounded end assembly 804b. Each of the rounded end assemblies 804a, 804b is anchored to the ground using an anchoring mechanism, one example of which is illustrated in FIGS. 11 and 12 and described in greater detail below.

The rounded end assemblies 804a and 804b each include a corresponding cylindrical opening 851 which is configured to receive and secure either a protective cap 838 (see e.g., FIG. 9) or a cylindrical post 870 (see e.g., FIG. 10).

In some configurations, such as in the pedestrian barrier 801 of FIG. 10, a number of upper plastic bumper rails 802 span and connect the cylindrical posts 870. Further details pertaining to the cylindrical posts 870 and to the attachment of the cylindrical posts 870 to the upper plastic bumper rails 802 can be found in U.S. Pat. No. 9,644,393, which is hereby incorporated in its entirety by reference.

2.1 Rounded End Assembly

Referring to FIGS. 11 and 12, the first rounded end assembly 804a includes an outer shell 842 with a cylindrical opening 851, a cap 838, a U-shaped strike plate 873, a plastic pin 844 and an anchoring assembly 843 including a washer 846 with through hole 884, an impact absorption member 848 with through hole 885, an inner core 850, a fastener 852, and a first pin-receiving socket 882.

The U-shaped strike plate 873 is attached to the outer shell 842 by two fasteners 854 that pass through two holes 856 in the U-shaped strike plate 873, through holes 858 in the sides of the rounded end assembly 804a, and into holes 859 in the inner core 850. In some examples, when a cylindrical post 870 is inserted into the cylindrical opening 851, the post 870 is positioned over and secured to the inner core 850, with the two fasteners 854 also extending through holes in a sidewall of the cylindrical post.

The anchoring assembly 843 attaches the first rounded end assembly 804a and the first end 816a of the main plastic bumper rail 803 to a mounting surface 824. When the anchoring assembly is assembled, the impact absorption member 848 is disposed in the inner core 850 and the washer 846 is disposed on top of the impact absorption member 848. The fastener 852 extends through the hole 884 in the washer 846, the hole 885 in the impact absorption member 848, holes 886 in a bottom wall 887 of the inner core 850 and is secured into the mounting surface 824. The first pin-receiving socket 882 is secured into the mounting surface 824 at a predefined distance from the inner core 850.

As was previously described in reference to FIG. 3, the ends of the plastic bumper rail 803 include through holes. When the first rounded end assembly 804a is assembled, the plastic pin 844 is inserted through the through holes and into the first pin-receiving socket 882.

In some examples, the rounded end assembly 804a has a rounded top wall 874 in which the cylindrical opening 851 is disposed. Two sidewalls 876 are attached below the rounded top wall 874 and are oriented substantially perpendicular to the mounting surface 824. A distal end 875 of the rounded top wall 874 and distal ends 877 of the two sidewalls 876 form the rail opening 818 in the outer shell 842.

Referring FIG. 12, the underside of the rounded top wall includes a second pin-receiving socket 896. When the protective barriers 800 and 801 are assembled, the outer shell 842 of the rounded end assembly 804a is secured on the anchoring assembly 843 (e.g., using fasteners, not shown). The a first end 816a of the plastic bumper rail 803 is received in the rail opening 818 and a proximal end 889 of the plastic pin 844 is received in the second pin-receiving socket 896. When the plastic pin 844 is positioned through the through hole in the first end 816a of the plastic bumper rail 803 with the proximal end 889 of the plastic pin 844 received in the second pin-receiving socket 896 and a distal end 888 of the plastic pin 844 received in the first pin-receiving socket 882, the first end 816a of the plastic bumper rail 803a is held captive in the rail opening 818 of the first rounded end assembly 804a.

The cap 838 has a shape corresponding to the hole 851 such that the cap 838 is configured for insertion into the hole 851 to close the hole 851. The cap is configured so that its exposed top surface matches the curvature of the rounded top wall 874.

The second rounded end assembly 804b has substantially the same structure as the first rounded end post and is not described further herein.

2.2 Center Assembly

In a manner similar to that shown in FIG. 5 and described above, a center assembly can be used to create longer protective collision barrier configurations.

Figure 13:
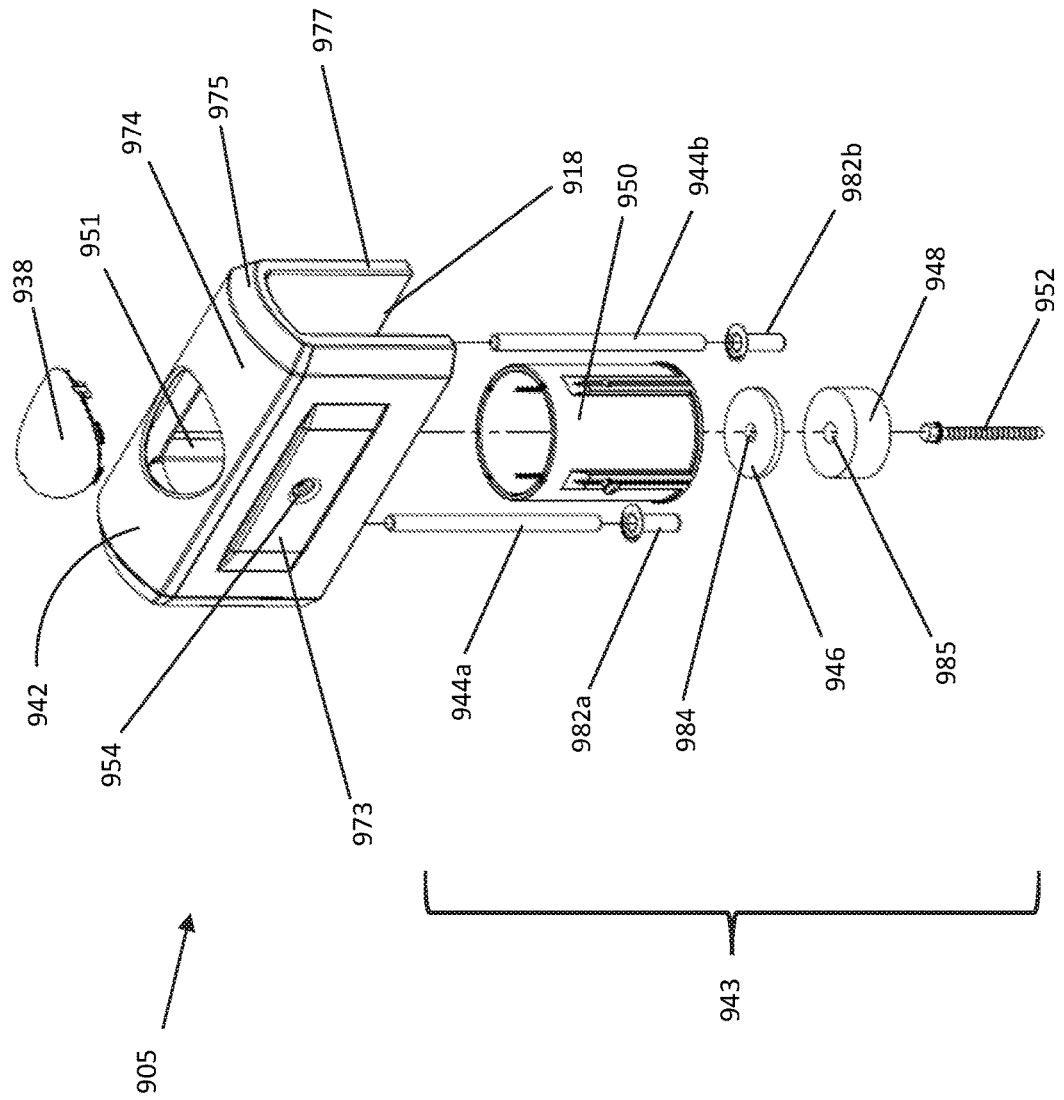
FIG. 13 is an exploded view of a center assembly.
Figure 14:
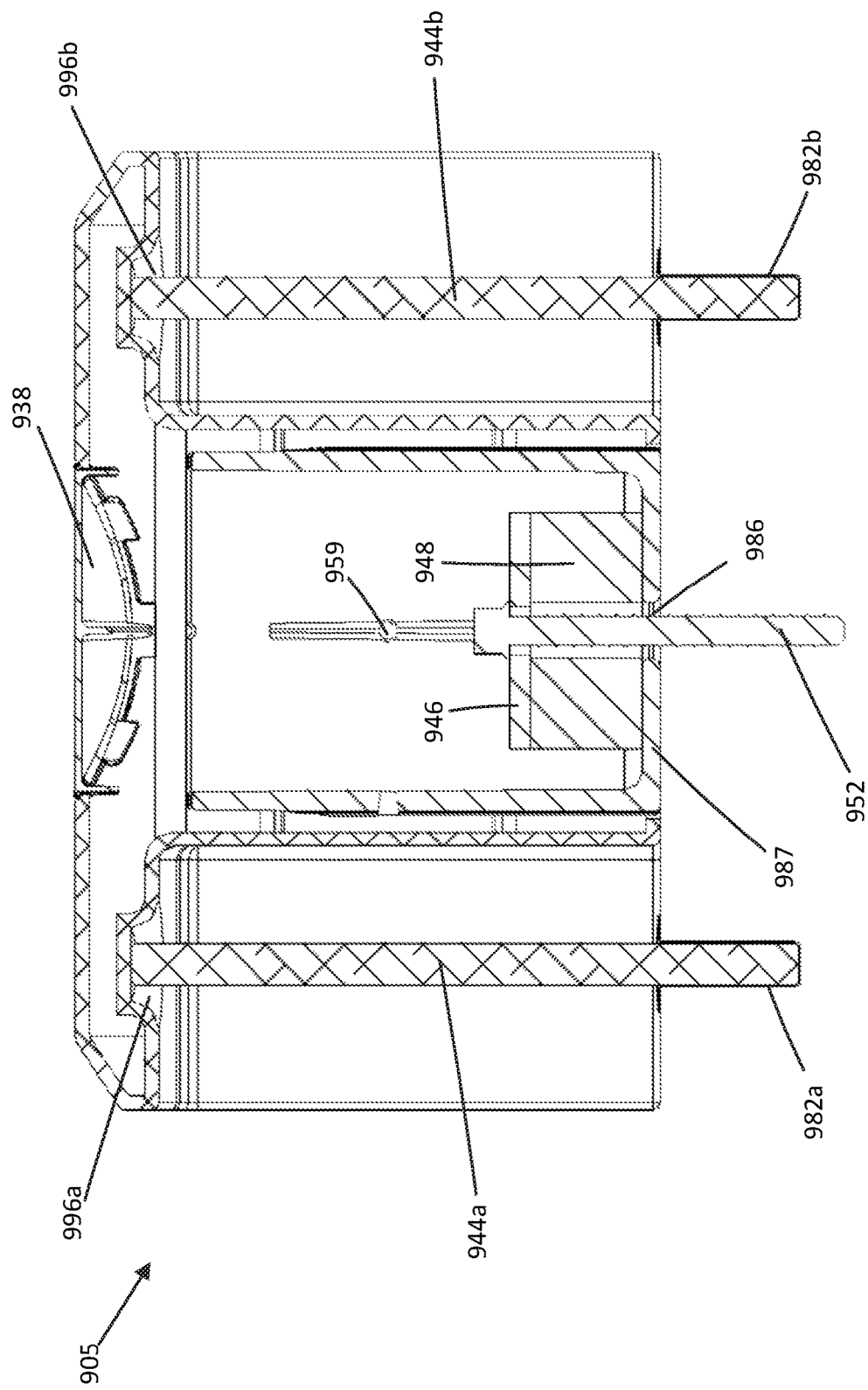
FIG. 14 is a cross-sectional view of the center assembly of FIG. 13.

Referring to FIGS. 13 and 14, one example of a center assembly 905 includes an outer shell 942 with a cylindrical opening 951, a cap 938, one or more strike plates 973, a first plastic pin 944a, a second plastic pin 944b, and an anchoring assembly 943 including a washer 946, an impact absorption member 948, an inner core 950, a first pin-receiving socket 982a and a second pin-receiving socket 982b.

The one or more strike plates 973 are attached to the outer shell 942 by fasteners 954 that pass through holes 956 in the strike plate 973, through holes 958 in the sides of the center assembly 905, and into holes 959 in the inner core 950.

In some examples, when a cylindrical post is inserted into the cylindrical opening 951, the post is positioned over and secured to the inner core 950, with the fasteners 954 also extending through holes in a sidewall of the cylindrical post. In other examples, the cylindrical opening 951 is closed with the cap 938 inserted therein (see FIG. 14).

The anchoring assembly 943 attaches the center assembly 905, the plastic bumper rail (not shown) and any attached cylindrical posts (not shown) in a manner similar to that shown in FIG. 1. When the anchoring assembly 943 is assembled, the impact absorption member 948 is disposed in the inner core 950 with the washer 946 disposed on top of the impact absorption member 948. The fastener 952 extends through holes 984 in the washer 946, holes 985 in the impact absorption member 948, holes 986 in a bottom wall 987 of the inner core 950, and is secured into the mounting surface (not shown, but similar to that shown in FIG. 12).

The first pin-receiving socket 982a is secured into the mounting surface (not shown) on a first side of the inner core 950 and at a predefined distance from the inner core 950. The second pin-receiving socket 982b is secured into the mounting surface (not shown) on a second side, opposite the first side, of the inner core 950 and at a predefined distance from the inner core 950.

The strike plates 973 are disposed on either side of the outer shell 942 and are attached to the outer shell 942 using fasteners 954 that pass through holes 954 in the strike plates 973, and through additional holes (not shown) in the sides of the outer shell 942 and are inserted into holes 959 in the inner core 950.

The outer shell has a rounded top wall 974 with an orientation parallel to the mounting surface on which the protective collision barrier is mounted. Two sidewalls 976 are attached to the rounded top wall 972 with an orientation substantially perpendicular to the mounting surface (not shown). Rail openings 918 are formed on opposite ends of the outer shell 942.

Referring to FIG. 14, an underside of the rounded top wall 974, includes a third pin-receiving socket 996a and a fourth pin-receiving socket 996b. When the protective barriers 800 and 801 are assembled, the outer shell 942 of the center assembly 905 is secured on the anchoring assembly 943 (e.g., using fasteners, not shown). Plastic bumper rails are inserted into the rail openings 918 and are secured in a manner consistent with previously described embodiments, with plastic pins 944a, 944b extending through ends of rails and secured in corresponding sockets 982a, 982b, 996a and 996b.

The cap 938 has a shape corresponding to the hole 951 such that the cap 938 is configured for insertion into the hole 951 to close the hole 951. The cap is configured so that its exposed top surface matches the curvature of the rounded top wall 974.

2.3 Corner Assembly

In a manner similar to that illustrated in FIG. 7 and described above, a corner assembly can be used to create protective collision barrier configurations that include bends.

Figure 15:
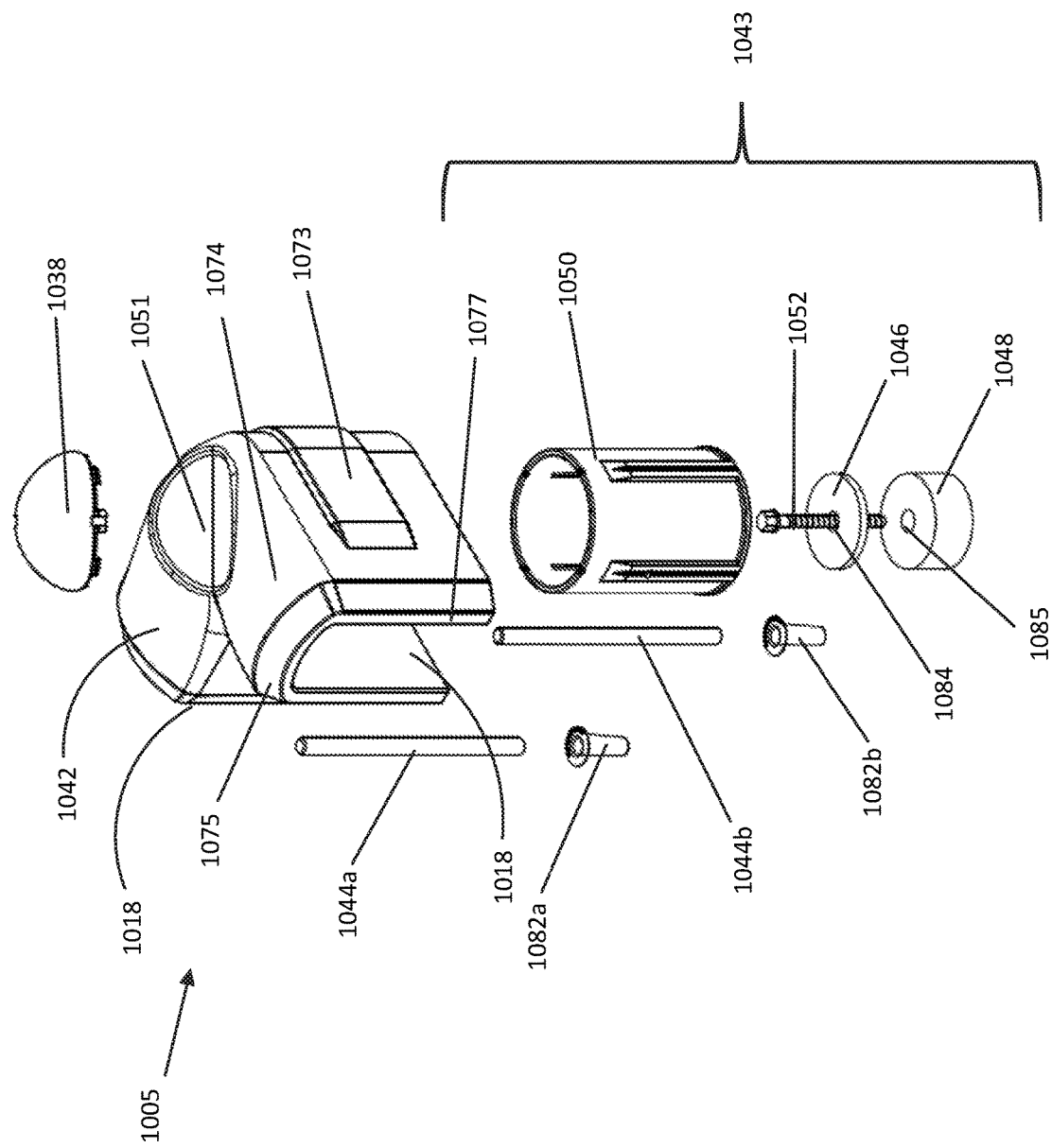
FIG. 15 is an exploded view of a corner assembly.
Figure 16:
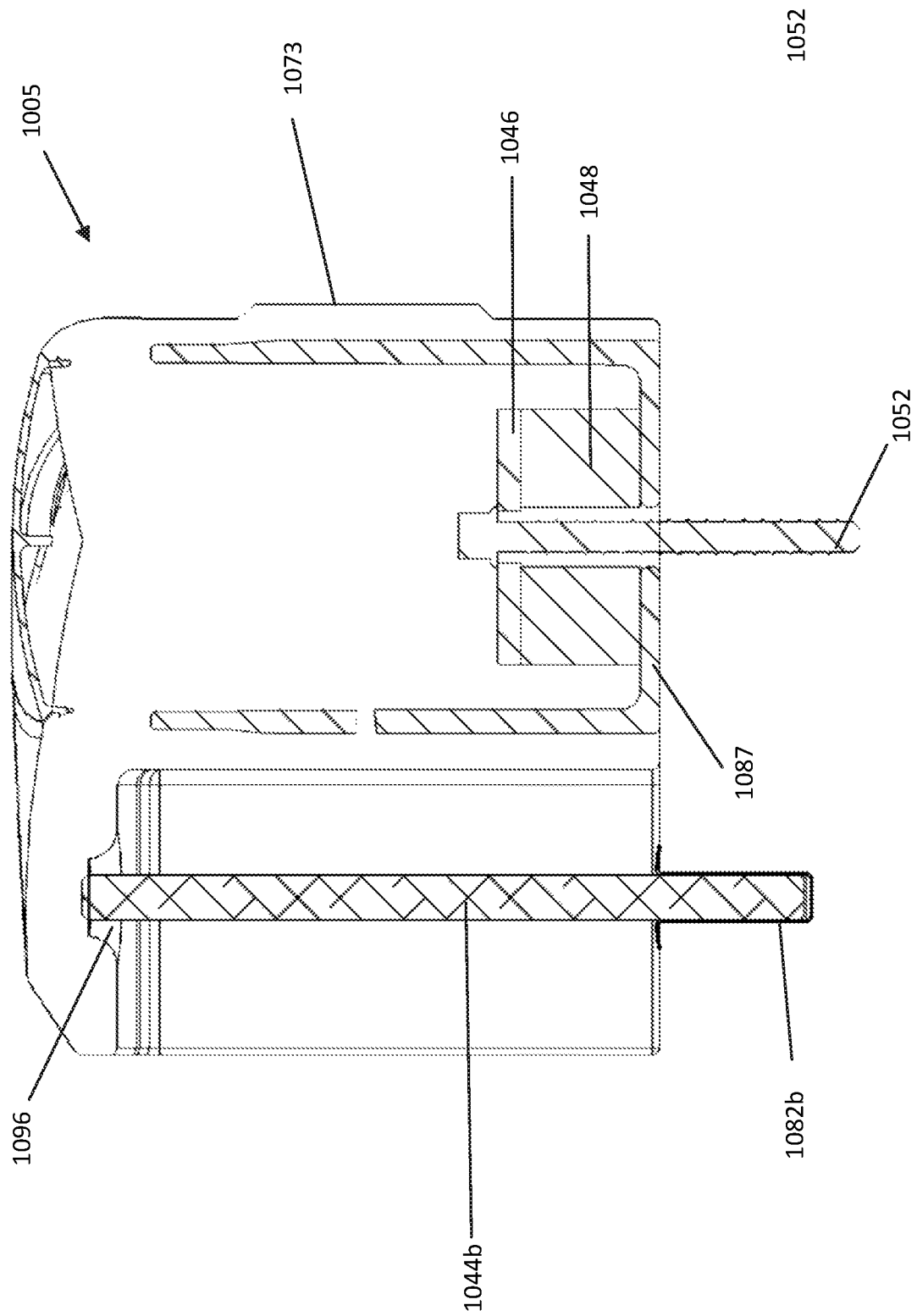
FIG. 16 is a cross-sectional view of the corner assembly of FIG. 15.

Referring to FIGS. 15 and 16, one example of a corner assembly 1005 includes an outer shell 1042 with a cylindrical opening 1051, a cap 1038, a strike plate 1073 a first plastic pin 1044a, a second plastic pin 1044b, and an anchoring assembly 1043, including a washer 1046, an impact absorption member 1048, a first pin-receiving socket 1082a a second pin-receiving socket 1082b, and a fastener 1052. Plastic bumper rails are inserted into openings 1018 in a manner similar to that described for the center assembly.

The corner assembly is configured and assembled a similar fashion as is described above for the center assembly (with the exception that the corner assembly is substantially 'L' shaped rather than straight) and is not described further herein.

3 Further Alternatives

It should be noted that, while the protective barrier configurations described above are especially useful, many other protective barrier configurations are possible. Indeed, the individual components can be combined into a virtually unlimited number of configurations.

In some examples, the bumper rails, the outer covers of the posts, and the pins are made of an HDPE material with a high visibility color (e.g., yellow). In some examples, the outer covers of the posts are formed by a blow molding or a rotational molding process. In some examples, the inner core is made of a metallic material.

In some examples, an epoxy resin is used to attach the anchoring mechanisms and certain of the pin-receiving sockets described above to the ground.

In general, certain components (e.g., the caps, the outer shells, and the inner cores) are fastened together using fasteners (e.g., screws or rivets) positioned through holes in the components.

In some examples, the inner diameters of the through holes in the ends of the rails are significantly greater than the outer diameters of the pins, such that the pins are able to move to a certain extent in the through holes without applying significant force to the rails.

It is to be understood that the foregoing description is intended to illustrate and not to limit the scope of the invention, which is defined by the scope of the appended claims. Other embodiments are within the scope of the following claims.

What is claimed is:

1. A protective barrier comprising:
a first assembly including a first plastic outer cover, the first plastic outer cover including a first opening with a first pin-receiving socket formed therein;
a second assembly including a second plastic outer cover, the second plastic outer cover including a second opening with a second pin-receiving socket formed therein;
a first hollow plastic rail including
   a first end disposed in the first opening of the first assembly such that a first through hole in the first end is aligned with the first pin-receiving socket, and
   a second end disposed in the second opening of the second assembly such that a second through hole in the second end is aligned with the second pin-receiving socket;
a first pin extending through the first through hole in the first end of the hollow plastic rail, the first pin having a proximal end disposed in the first pin-receiving socket and a distal end disposed in a third pin-receiving socket; and
a second pin extending through the second through hole in the second end of the hollow plastic rail, the second pin having a proximal end disposed in the second pin-receiving socket and a distal end disposed in a fourth pin-receiving socket.

2. The protective barrier of claim 1 wherein both the third pin-receiving socket and the fourth pin-receiving socket are configured to be disposed in a mounting surface on which the protective barrier is mounted.

3. The protective barrier of claim 2 wherein
the first assembly includes a third opening with a fifth pin-receiving socket formed therein,
the second assembly includes a fourth opening with a sixth pin-receiving socket formed therein,
the protective barrier further comprising:
   a first cap disposed on the first assembly, the first cap including a seventh pin-receiving socket,
   a second cap disposed on the second assembly, the second cap including an eighth pin-receiving socket,
   a second hollow plastic rail including
      a third end disposed in the third opening of the first assembly such that a third through hole in the third end is aligned with the fifth pin-receiving socket and the seventh pin-receiving socket, and
      a fourth end disposed in the fourth opening of the second assembly such that a fourth through hole in the fourth end is aligned with the sixth pin-receiving socket and the eighth pin-receiving socket;
   a third pin extending through the third through hole in the third end of the second hollow plastic rail, the third pin having a proximal end disposed in the seventh pin-receiving socket and a distal end disposed in a fifth pin-receiving socket; and
   a fourth pin extending through the fourth through hole in the fourth end of the second hollow plastic rail, the fourth pin having a proximal end disposed in the eighth pin-receiving socket and a distal end disposed in a sixth pin-receiving socket.

4. The protective barrier of claim 3 wherein the first hollow plastic rail has a first degree of rigidity and the second hollow plastic rail has a second degree of rigidity, the first degree of rigidity being greater than the second pf of degree rigidity.

5. The protective barrier of claim 1 further comprising a first cap disposed on the first assembly, the first cap including the third pin-receiving socket and a second cap disposed on the second assembly, the second cap including the fourth pin-receiving socket.

6. The protective barrier of claim 5 wherein a portion of the first opening is formed by a portion of the first cap and a portion of the second opening is formed by a portion of the second cap.

7. The protective barrier of claim 6 wherein the third pin-receiving portion is disposed in the first opening of the first assembly and the fourth pin-receiving portion is disposed in the second opening in the second assembly.

8. The protective barrier of claim 1 wherein the first assembly includes a first anchoring mechanism disposed in the first outer cover, the first anchoring mechanism configured to anchor the first assembly to a surface, and the second assembly includes a second anchoring mechanism disposed in the second outer cover, the second anchoring mechanism configured to anchor the second assembly to the surface.

9. The protective barrier of claim 8 wherein the first anchoring mechanism includes a first shock absorption mechanism and the second anchoring mechanism includes a second shock absorption mechanism.

10. The protective barrier of claim 8 wherein both the first anchoring mechanism includes a first metallic core and the second anchoring mechanism includes a second metallic core.

11. The protective barrier of claim 1 wherein the first assembly includes a first top opening on a top surface of the first plastic outer cover and the second assembly includes a second top opening on a top surface of the second plastic outer cover.

12. The protective barrier of claim 11 wherein a first cap is disposed in the first top opening and a second cap is disposed in the second top opening.

13. The protective barrier of claim 11 wherein a first post is disposed in the first top opening and a second post is disposed in the second top opening.

14. The protective barrier of claim 13 wherein one or more rails are coupled to and extend between the first post and the second post.

15. The protective barrier of claim 13 where the first post is coupled to a first anchoring mechanism disposed in the first assembly and the second post is coupled to a second anchoring mechanism disposed in the second assembly.

16. The protective barrier of claim 1 further comprising a first strike plate attached to the first assembly and a second strike plate attached to the second assembly.

17. The protective barrier of claim 1 wherein the first assembly includes a third opening with a fifth pin-receiving socket formed therein.

18. The protective barrier of claim 17 further comprising:
a second hollow plastic rail including a third end disposed in the third opening of the first assembly such that a third through hole in the third end is aligned with the fifth pin-receiving socket, and
a third pin extending through the third through hole in the third end of the second hollow plastic rail, the third pin having a proximal end disposed in the fifth pin-receiving socket and a distal end disposed in a sixth pin-receiving socket.

19. The protective barrier of claim 18 wherein the first opening and the third opening are disposed on opposite sides of the first assembly.

20. The protective barrier of claim 19 wherein the first opening faces in a first direction, the second opening faces in a second direction, and the first direction is perpendicular to the second direction.

* * * * *